United States Patent [19]

Eastland, Jr. et al.

[11] Patent Number: 5,002,645

[45] Date of Patent: Mar. 26, 1991

[54] PROCESS OF SEPARATING AND RECOVERING METAL VALUES FROM A WASTE STREAM

[75] Inventors: George W. Eastland, Jr., Saginaw; Robert L. Wright; Thomas A. Vivian, both of Midland, all of Mich.

[73] Assignee: Saginaw Valley State University, University Center, Mich.

[21] Appl. No.: 386,342

[22] Filed: Jul. 27, 1989

[51] Int. Cl.$^5$ .............................................. C02F 1/48
[52] U.S. Cl. ........................ 204/157.42; 204/157.15; 204/130; 204/140; 210/688; 210/912; 210/913; 423/54; 423/55; 423/DIG. 14
[58] Field of Search .................. 204/140, 157.42, 130, 204/157.15; 210/688, 912, 913; 423/54, 55, DIG. 14

[56] References Cited

U.S. PATENT DOCUMENTS

| | | | |
|---|---|---|---|
| 2,733,204 | 1/1956 | Costa | 423/54 |
| 3,245,892 | 4/1966 | Jones | 204/157.42 |
| 4,151,257 | 4/1979 | Müller et al. | 423/53 |
| 4,318,788 | 3/1982 | Duffey | 423/53 |
| 4,369,100 | 1/1983 | Sawyer | 204/157.42 |
| 4,680,126 | 7/1987 | Frankard et al. | 204/DIG. 13 |
| 4,731,166 | 3/1988 | Jones | 204/157.42 |
| 4,755,270 | 7/1988 | Aliotta | 204/157.42 |

FOREIGN PATENT DOCUMENTS 51-28597  3/1976  Japan .

OTHER PUBLICATIONS

The Journal of Inorganic Nuclear Chemistry, 1977, vol. 39, pp. 1081-1084, Basak et al.

Primary Examiner—John F. Niebling
Assistant Examiner—David G. Ryser
Attorney, Agent, or Firm—Brooks & Kushman

[57] ABSTRACT

Described is a method of separating and recovering metal values from a waste stream containing metal hydroxides comprising the steps of providing an aqueous waste stream containing metal values including chromium; subjecting the waste stream to an oxidation process to convert the chromium to chromium (VI); precipitating the other metal values in the aqueous stream by adjusting the pH of the stream to cause the precipitations; and separately recovering the chromium (VI) from the remaining metal values. The process described pertains to separating and recovering metal values such as those from an electroplating process or an electroless process wherein the metals may be iron, cobalt, zinc, cadmium, nickel, copper, silver, aluminum and chromium. The chromium recovery step is performed by oxidizing chromium (III) to chromium (VI) preferably in the presence of a manganese catalyst and preferably utilizing ultrasound waves. The remaining metal values are separated by the use of a chelating ion exchange resin.

13 Claims, 1 Drawing Sheet

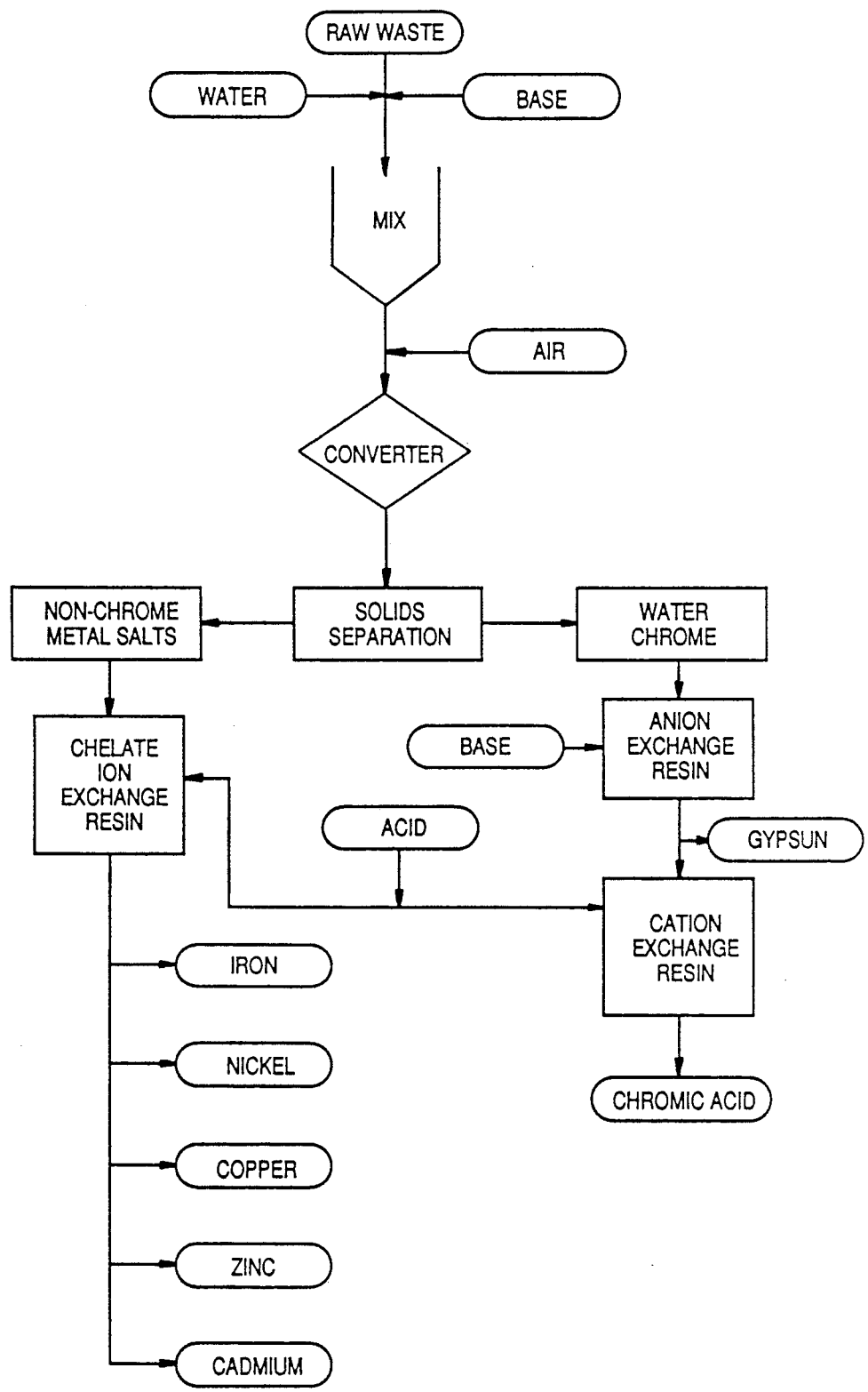

PROCESS OF SEPARATING AND RECOVERING METAL VALUES FROM A WASTE STREAM

BACKGROUND OF THE INVENTION

This application pertains to the field of separating and recovering metal values from a waste stream. In particular, the waste stream is that which is generated during the course of depositing metals onto a substrate such as electrolytic deposition of metals onto a substrate or the electroless deposition of metals onto a substrate. Due to substantial environmental concerns of metals that are present in waste streams, it is deemed desirable to recover such metals and to reuse them in an economically designed process.

Regenerating spent electrolytic baths containing chromium by oxidizing undesirable ions, separating formed oxides and concentrating the solution is discussed in Japanese patent application No. 123033, filed Oct. 31, 1973 and published June 16, 1975 as Japanese publication No. 50/72834. A rinsing waste solution from hard chromium plating containing chromium (VI) and iron ions with a pH of 2.3 was subjected to ultrasound source (1.35 MHz 30-W). An increase in chromium (VI) was obtained with a decrease in iron ions.

Japanese patent application No. 74/101528 filed Sept. 3, 1974 and published Mar. 10, 1976 discloses chromate in a waste water solution which is reduced and precipitated as chromium hydroxide. An alkali is added to the chromium hydroxide and the mixture is treated ultrasonically under oxygen atmosphere. The chromic acid is obtained by passing the resulting solution through a hydrogen ion type ion exchange resin.

The oxidation of chromium (III) ions by manganese dioxides is discussed in The Journal of Inorganic Nuclear Chemistry, 1977, Vol. 39 pages 1081-1084, Basak et al.

U.S. Pat. No. 3,245,892 teaches a method for ultrasonically activating chemical reactions requiring the presence of a catalyst.

U.S. Pat. No. 4,369,100 describes a method for enhancing chemical reactions in a constantly flowing stream of liquid which contains air as an oxidant which in turn is subjected to ultrasonic cavitation.

U.S. Pat. No. 4,731,166 teaches a method of producing an adherent smooth depositive chromium on a ferrous substrate. Ultrasonic energy is used to remove nodular ferrous nodules from the substrate prior to electroplating chromium thereon.

U.S. Pat. No. 4,755,270 describes a method of processing waste solutions containing metal salts or complex involving applying ultrasonic vibrations to a container in which the solution is placed to mist the water and subsequently capturing the water vapor discharge from the container, exhausting the vapor through a filter to capture any heavy metals in the water vapor.

The references do not suggest a technique for commencing with a waste stream containing a variety of metal values, and subjecting the waste stream to a multiplicity of processing steps to separate and recover the metal values present in the waste stream. The references likewise do not suggest the obtaining of these metal values without undesirable waste streams which likewise need to processed so as not to generate significant environmental concerns.

SUMMARY OF THE INVENTION

Described is a process of separating and recovering metal values from a waste stream containing metal hydroxides comprising the steps:

(1) Providing an aqueous waste stream containing multiple metal values including chromium;

(2) Precipitating the non-chrome metal values in the aqueous stream by adjusting the pH of the stream;

(3) Subjecting the waste stream to an oxidation process to convert the chromium (III) to chromium (VI);

(4) Separating and recovering the chromium (VI) from the remaining metal values.

The oxidation process is preferably conducted in the presence of a catalyst such as a manganese catalyst by bubbling an oxygen source through the waste stream.

BRIEF DESCRIPTION OF THE DRAWING

FIG. 1 is a schematic diagram of the treatment of the waste stream pursuant to the process of the present invention.

DESCRIPTION OF PREFERRED EMBODIMENTS

The present invention is concerned with waste streams that are generated in the deposition of metals onto substrates. Generally, the deposition is performed by virtue of an electrodeposition process. Other deposition processes may be used such as electroless or other catalytic deposition techniques. The waste stream can be characterized as containing heavy metals. The metals generally include chromium, iron, cobalt, zinc, cadmium, nickel, copper, silver, aluminum and the like.

The waste stream that is to be provided in the present process can be the waste stream from the initial plating process whether it be an electroplating process or an electroless process. Some electroless plating processes could be hot dipped galvanized coatings onto steel, aluminum coating of steel, hot dipped coating of steel and cast iron, chemical vapor deposition, oxidation protective coatings, phosphate corrosion resistant coatings, chromate conversion coatings and the like. Alternatively, the waste stream that is to be provided in the process of the present application could be a dried sludge from the initial waste treatment formed during the normal manufacturing operations.

It is most desirable that the waste stream contained from 0.5 to 20% by weight of the metallic ions that ought to be removed whether they be in the cation state or in the anionic form, preferably 1 to 15% and even more preferably from 3 to 10% by weight of a composition.

In the initial stages of the process, it is desirable to convert the chromium that is present in the waste stream to the hexavalent state. This is performed by an oxidation process preferably in the presence of a manganese catalyst. The manganese catalyst concentration is generally small, ranging from about 0.01% to about 10% by weight preferably 0.1% to about 1% by weight of the composition being treated. The manganese is preferably a manganese halide or oxide, preferably manganese chloride or bromide or manganese oxide or dioxide.

The manganese that is provided is in particulate form ranging from about 1 to about 50 microns preferably 2 to 25 microns in size.

The treatment temperature for the chromium oxidation step generally is about 5° centigrade to 90° centigrade, preferably about 25° to 35° centigrade.

The oxidation step occurs with use of a source of oxygen, by bubbling air or oxygen through the waste stream or by adding a peroxide such as hydrogen peroxide.

Since the entire waste treatment stream is being treated with all of the undesirable metal ions present, the stream is subjected to an adjustment of pH so that the ions will be precipitated and, at the same time, permitting the oxidation process of the chromium from the trivalent to the hexavalent state. The metal ions will precipitate at a basic pH, preferably 7.5 to 12 pH, and even more preferably from about 8 to 11 pH.

The chromium oxidation step takes place preferably in the presence of ultrasonic equipment. By this it is meant that the ultrasonic waves operate at 1 to 100 k hertz (KHz), preferably 10 to 80 KHz, and even more preferably from about 15 to 50 KHz.

After the oxidation of the chromium, the resulting metal precipitates are separated from the chromium by a filtration process. Thereafter, the solution is treated to an anion exchange resin with effluent water from an anion exchange process making up the diluent in step 1.

Sodium chromate is recovered from the anion resin by elution with sodium hydroxide. The sodium ion is replaced with a hydrogen ion using a cation exchange resin such as Dowex MSC-1, 20–50 mesh. Other cation exchange resins may also be employed. The metal precipitates, less the chromium value, are then redissolved in the waste stream by the addition of acid to a pH below 6 and diluted with water to 0.0 1 to 1 molar metal concentration in the water. Thereafter, the metals are retrieved from the water stream by subjecting them to a chelating ion exchange resin. Each of the individual metals has a different affinity for the resin. While these affinities vary from different chelating resins, a typical resin based on picolylamine (2 amino-methylpyridine) will have affinities in the following ranges: copper->nickel>cobalt>zinc>cadmium>iron->aluminum>magnesium. These metals are then eluted from the resin in the reverse order of their affinity by flushing the resin with water gradually lowering the pH of the water stream to between 0 and 1. At this point, all of the metals have been removed from the resin except for copper, which is held so tightly that ammonium hydroxide is required to remove it.

The chelating resin that may be employed is one generally available as Dow XF-4195, 16–50 mesh which is a macroporous copolymer B of polystyrene-divinylbenzene. The general structure of this resin is based on bispicolylamine (polymer containing 2-aminomethyl pyridine). Other chelating ion exchange resins may also be used.

Having described the invention in general, listed below are examples of preferred techniques for separating or covering the metal values where all percentages are percentages by weight and temperatures are in degrees centigrade.

EXAMPLE 1

The first step in the process of metal separation is to maintain the metals at a pH greater than 10 while the chromium (III) is oxidized to chromium (VI).

A solution of chromium (III) chloride was dissolved in water containing 0.005 M chromium. Base, potassium or sodium hydroxide, was added to the chromium (III) solutions to give chromium (III) hydroxide, with further base added to give solutions of $[Cr(OH)_4]^-$. Manganese, used as a catalyst, was added as solid manganese (II) chloride dissolved in water. The oxidation of the chromium (III) solution by air was carried out by drawing air through the solutions by means of a vacuum applied to the side-arm of a flat-bottomed, vacuum filtering flask. The air was drawn down through the top of the flask fitted with a rubber stopper and glass tubing. The bottom of the glass tubing had a sintered glass disk which broke the air stream up into small bubbles. The vacuum was produced by a water aspirator. Occasionally, the solutions were heated by placing the flasks on a hot plate. Exposure of the solution to ultrasonic waves was accomplished by placing the flask in a water-filled ultrasonic cleaner operating at 47KHz. The presence of chromium (III) and/or chromium (VI) was detected by examining the solutions for their characteristic ultraviolet-visible (electronic) absorbencies in an IBM ultraviolet-visible spectrophotometer.

Solutions containing 0.1, 0.01, and 0.001 grams of manganese (II) chloride were added to separate 0.005 M chromium (III) solutions, pH = 12. The solutions had air drawn through them, and heated to 60° C., for 22 hours. In the 0.1 gram manganese (II) solution, there was no green precipitate of chromium (III), but there was a brown precipitate (which was found to be a manganese compound). There seemed to be virtually a complete oxidation of the chromium (III). As the amount of manganese was reduced, there was a greater inclination for the chromium (III) to precipitate thereby lower conversion of chromium (III) to chromium (VI). Simple qualitative tests for manganese (II) in the solutions proved negative. The brown manganese precipitate was collected, and added to a new solution of chromium (III) in base. That solution was heated and exposed to air for 24 hours, and again, the chromium underwent oxidation.

Two identical reactions were run, 0.005 M chromium (III), at a pH of 12, with manganese (II) (0.1g), exposed to air. One of the reactions was performed in an ultrasonic cleaner. The temperature of the water was 50° C. in the cleaner. The other reaction, the control, was done without the cleaner and was heated to a similar temperature on a hot plate. The control reaction took about 24 hours, giving the customary green precipitate and chromium (VI) in solution. The reaction in the ultrasonic cleaner took two hours to completely convert the chromium (III) to the chromium (VI) and gave no green chromium (III) precipitate.

EXAMPLE 2

A sample of metal wastes was received from a commercial chrome electroplater. The chrome in solution after oxidation had a concentration of 0.01 molar/liter.

This sample was 60% solids, 10% chrome, 12% nickel, and 14% copper. 10g. of the sample was added to 500 cc of deionized water. The pH was adjusted to 12 with sodium hydroxide and 0.26 g. manganese (II) chloride was added. The resultant mixture was diluted to 1L with deionized water to give 0.001 M $MnCl_2$ concentration and a 0.6% solids concentration consisting of 1.98 g $Cr(OH)_3$ was oxidized as in Example 1 to $Na_2CrO_4$ by exposure to ultrasonics and air for 24 hours. The resultant mixture was filtered and 0.019 molar sodium chromate (1.0 g Cr) was in the liquid while 4.0 g of solids were left after drying. The sodium chromate solution was gravity flowed through an anion exchange resin $OH^-$ (Dowex NSA-1, 16 × 50 mesh). No color was seen coming through the column indicating removal by the resin of all of the chromate. The chromate was released from the resin by flowing 22 cc of 0.1N NaOH through the column giving a solution of 0.091 molar concentration $Na_2CrO_4$.

The importance of this step relates to the high purity of the chromic acid eventually recovered in addition to the concentration effect demonstrated by the data shown above. This is due to the fact that while the filtration step effectively separated the insoluble metal hydroxides from the soluble chromium (VI), the solubility constant is such that an equilibrium exists between the solute and the precipitate. This means that while greater than 99% of the metal hydroxides are in the precipitate there still exists minute concentrations in the parts per million range that are in solution with the sodium chromate. These metals are in the form $M^+OH$. The chrome is in the form $Na_2^{++}CrO_4^{=}$. In flowing the filtered solution over the anion exchange resin (ROH), the chromate is retained by the resin in the form ($R-CrO_4$) while the cation metals have zero affinity for the resin and even the minute impurities are separated by their continued flow through the column where the water can be used to separate the next batch of metals and the now ultra pure chromate can be subsequently removed from the anion resin for conversion from sodium chromate to chromic acid.

200 cc of $Na_2CrO_4$ solution was then flowed through an ion exchange column containing a hydrogen form cation exchange resin (Dowex MSC-1, 20–50 mesh). The solution passed through the column was chromic acid, $H_2CrO_4$, at 0.091 molar concentration. The water was removed from the chromic acid solution by distillation to give 1.82 g. chromium trioxide, $CrO_3$, containing 0.95 g. chrome and 200 cc of pure distilled water. The cation exchange resin was returned to the hydrogen form from the sodium form by flowing 0.2 molar sulfuric acid through the resin column. The excess effluent acid from the column regeneration was used to dissolve the precipitate of nickel and copper filtered and dried earlier. The solution was diluted to 0.010 molar $NiSO_4$ (0.011 molar $CuSO_4$) with water and passed through an ion exchange column containing the chelating resin (Dow XF-4195, 16–50 mesh). XF-4195 is a macroporous copolymer bead of polystyrene-divinylbenzine within which weakly basic chelating functional groups are covalently bonded. The general structure of this resin is based on bispicolylamine, which is attached to the copolymer to give the following structure:

Polymer (Pyridine-2)—$CH_2$—N—$CH_2$—(2-Pyridine)

While flowing the mixture through the resin, consecutive 50 cc samples were collected for analysis for nickel and copper. The samples were analyzed by U.V. Spectroscopy. Following loading, the column was eluted by increasing concentrations of sulfuric acid until 98 samples had been collected at which time 500 ml of 1M ammonium hydroxide was used to elute the remaining copper. Zero metals were seen for samples 1–38. Nickel only was observed in samples 39–71 with the strongest concentrations of nickel between samples 45–60. No metals were seen in samples 72–74. Copper was observed in samples 75–129 with the strongest concentrations in samples 100–102. No metals were observed after sample 129.

While the invention has been described in detail and with reference to specific embodiments thereof, it will be apparent to one skilled in the art that various changes and modifications can be made therein without departing from the spirit and scope thereof.

What is claimed is:

1. A process for separating and recovering Cr(VI) from a waste stream containing chromium and at least one metal value selected from the group consisting of copper, nickel, cobalt, zinc, cadmium and iron, comprising the steps:
   (1) providing an aqueous Cr(III) waste stream having an alkaline pH further containing at least one metal value selected from the group consisting of copper, nickel, cobalt, zinc, cadmium and iron, thereby maintaining the non-chrome metal values in a precipitated state;
   (2) subjecting the stream of Step 1 to an oxygen oxidation process from an oxygen source to convert the Cr(III) to Cr(VI) in the presence of a manganese catalyst and using an effective amount of ultrasonic waves to assist the conversion of Cr(III) to Cr(VI);
   (3) isolating the Cr(VI) from the other metal values in the aqueous stream in Step 2 by a process of solid-liquid separation;
   (4) recovering the Cr(VI) as chromic acid from the liquid portion of Step 3 using a cation exchange resin; and
   (5) dissolving the solids portion from Step 3 containing the other metal values and separating the values one from the other using an ion exchange column.

2. The process of claim 1 wherein the pH ranges from about 8 to about 12.

3. The process of claim 1 wherein the manganese catalyst is comprised of manganese halide.

4. The process of claim 1 wherein the manganese catalyst is comprised of manganese oxide.

5. The process of claim 1 wherein the ultrasonic waves used have a range of about 1 to about 100 KHz.

6. The process of claim 5 wherein the ultrasonic waves range from about 10 to about 80 KHz.

7. The process of claim 1 wherein the waste stream is that generated from an electroplating process or an electroless process.

8. The process of claim 7 wherein the waste stream is from an electroplating process.

9. The process of claim 7 wherein the waste stream is from a electroless process.

10. The process of claim 7 wherein the waste stream contained the metal values of chrome, nickel and copper.

11. The process of claim 1 wherein the waste stream is provided in the form of a dried sludge.

12. The process of claim 1 wherein the waste stream contains from about 0.5–20 wt. % of metal values.

13. The process of claim 1 wherein the oxygen source is air.

* * * * *